Patented Nov. 1, 1932

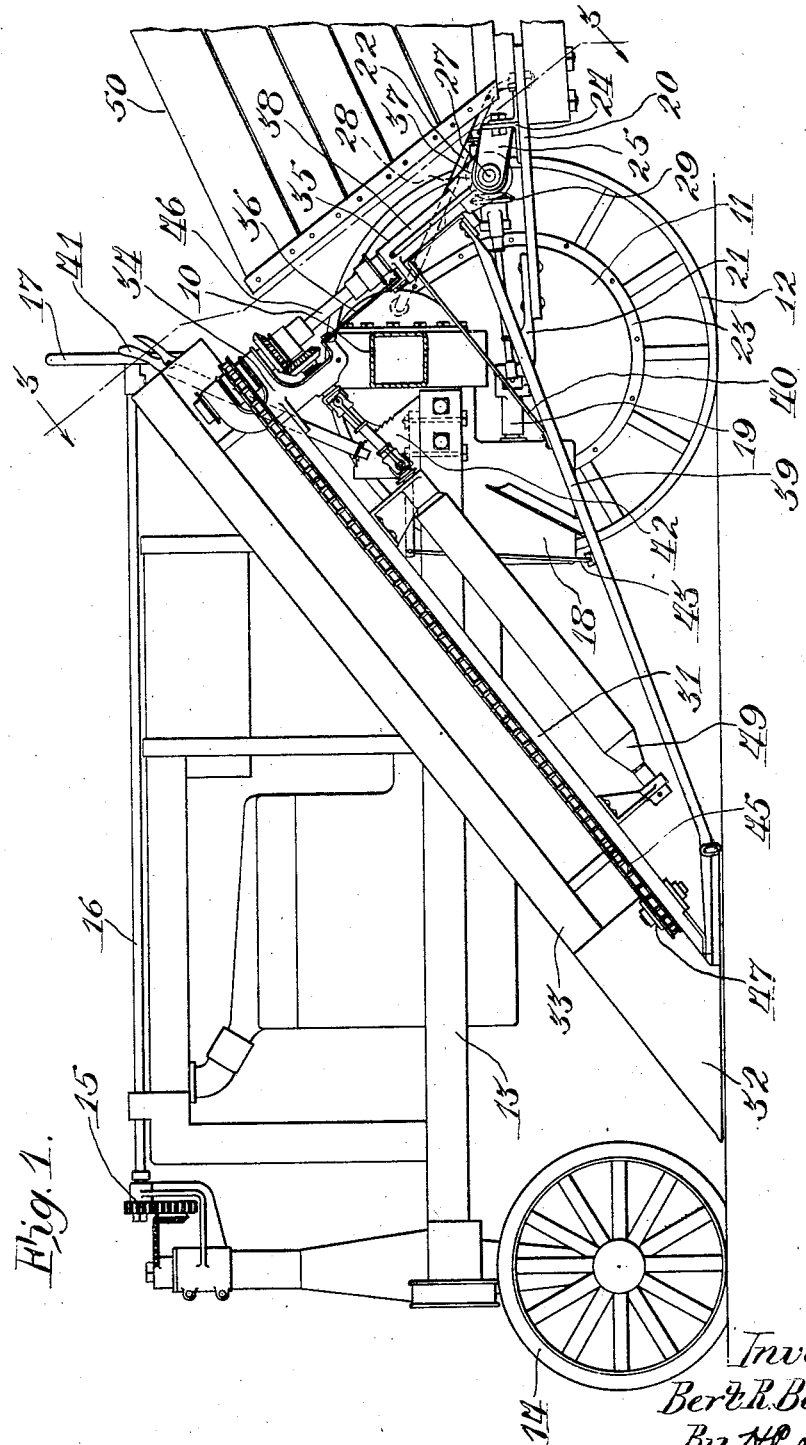

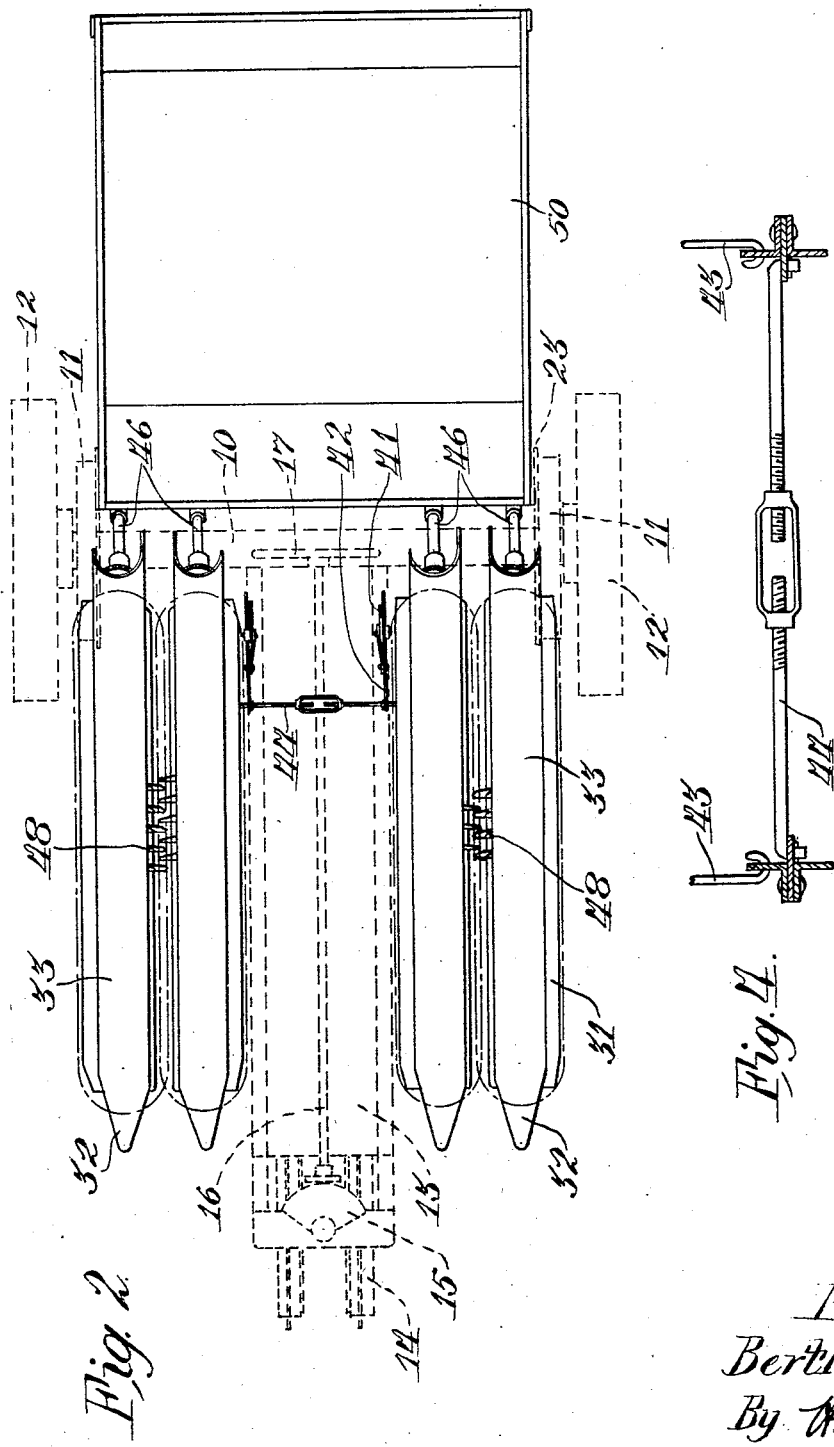

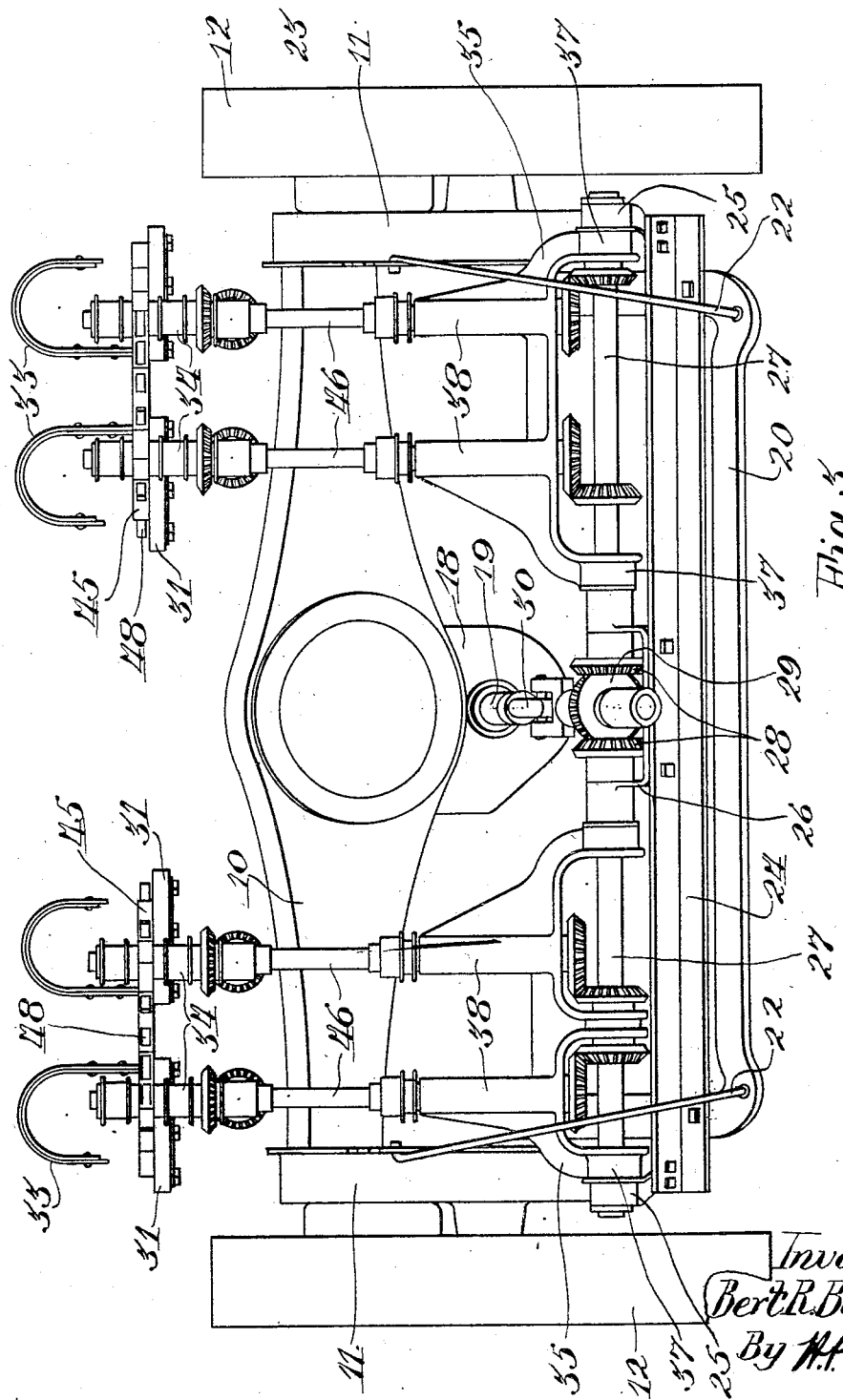

1,886,152

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR ROW-CROP HARVESTER

Application filed August 24, 1929. Serial No. 388,111.

The present invention relates to self-propelled harvesting machines, and in particular to machines of the type adapted to gather row grown crops.

The objects of the invention are to combine row crop harvesting mechanism with a tractor of conventional type in a manner to properly distribute the weight of the mechanism on the tractor, locate the crop gathering unit where it will be under observation from the driver's station on the tractor, be gauged in its relation to the ground level by certain of the tractor wheels, and be supported on the tractor in a manner to best provide for resistance to working stresses and for adjustment to the most efficient working positions.

In its more specific aspect, the invention is directed to the provision of cotton harvesting mechanism in the nature of an attachment for a standard type of tractor, capable of operation on two plant rows at once and embodying the improvements above outlined, which mechanism comprises forward plant stripping units driven from the tractor power plant and associated with crop receiving means at the rear, all mounted and supported on the tractor in a novel and simplified way.

The invention accordingly resides in the general organization and details of construction hereinafter more specifically described and defined in the claims, one embodiment of which is illustrated in the accompanying drawings, where:

Figure 1 is a side elevation of a tractor cotton stripper embodying the invention, part of the tractor axle structure being shown in section;

Figure 2 is a plan view of the tractor-stripper combination;

Figure 3 is a view from above and behind the tractor, viewing the structure from line 3—3 in Figure 1; and, Figure 4 is a detail of a tie-rod connection between the stripper frames.

In the present instance, the invention is illustrated as embodied in a two row cotton stripper mounted on a tractor of the wide tread row-crop type. The tractor referred to comprises an extended arched rear axle structure having a transverse housing 10 and depending end housings 11, on the outer sides of which the traction wheels 12 are mounted. The rear axle structure and wheels are designed to span a space ordinarily required for two plant rows of such crops as cotton, corn, etc. The central narrow body 13 of the tractor extends forwardly from the axle structure and is supported at the front on a steering truck 14, which travels between the plant rows straddled by the rear axle. The truck has a vertical standard swiveled in the front or crosshead of the tractor body, and this is connected through suitable gears at 15 with a steering rod 16 having a hand wheel 17 at the operator's station on the rear of the tractor. The body 13 includes the usual power plant and housings for the clutch and transmission, as seen in Figure 1.

The tractor also includes a lower housing 18 which forms a downward extension of the transmission housing and contains the driving gears for a central, rearwardly projecting power take-off shaft 19, which lies on a horizontal plane below the axle housing 10 and is driven through the transmission gearing of the tractor. The tractor briefly described is a well known row-crop tractor, and its structure forms part of the present invention only insofar as it enters into the novel combination to be described.

The cotton harvesting apparatus, which is illustrated as combined with the tractor, comprises a substantially horizontal, rearwardly extending support 20, which may be a flat bar of the U-shaped form illustrated constituting the general purpose drawbar of the tractor. The arms of this support 20 are connected at 21 to the inner sides of the depending portions 11 of the axle structure, and hanger links 22 connect the rear corners of the U-shaped bar to notched flanges 23 on the parts 11 of the axle structure. The flanges 23 will preferably be provided with a plurality of notches or apertures for reception of the bent upper ends of the links 22 to afford a range of vertical adjustment for the support 20. The preferred support and hanger link structure is disclosed in assignee's patent to Benjamin et al. 1,636,276, July 19, 1927. A bearing member or bar 24 extends transversely across the support 20 and is bolted thereto. This bar may comprise two connected angle iron sections, as seen in Figure 1, providing an upstanding flange to which are secured end bearing brackets 25 (Figure 3) and a central double bearing bracket 26. The bearing brackets 25 and 26 have journaled therein, at each side of the central longitudinal line of the tractor, transversely aligned shafts 27. Each shaft 27 has a bevel pinion 28 secured to its inner end, and these pinions are in mesh with a drive pinion 29 on the end of a flexible drive shaft 30 extending from the power take-off shaft 19.

The aligned shafts 27 respectively serve as drive transmitting elements and as the main supports for forwardly extending frame structures carrying the harvesting mechanisms, which frames are positioned at each side of the tractor body and within the tread lines of the traction wheels. As the structure at one side of the tractor is duplicated on the opposite side, except as to the necessary reversal of the driving pinions on the respective shafts 27, description of the frame structure, drive mechanism, etc. on one side of the tractor will serve for both. The unit on the left side of the tractor and seen in Figure 1 will accordingly be described.

The harvesting unit in this instance comprises an elongated inclined frame composed of a pair of parallel, spaced conveyer plates or boards 31, between which the row of cotton plants passes. The lower end of each plate 31 has secured to it a conical nose-piece or stalk lifter 32, the lower side of which is flattened and designed to ride on or adjacent to the ground level, and the upper side of which merges into a curved shield 33 overhanging each conveyer plate 31 and having a vertical inner wall forming, with the wall of the opposite shield, a conveying channel for material gathered by the stripping means to be described as mounted on each plate. The frame of the unit also includes a rearward and downward extension from the upper ends of the plates 31. This is shown as comprising upper bearing castings 34 secured to the respective plates 31, a lower bearing casting 35, and connecting bars 36. The lower casting is of arched form and its arms 37 are pivoted on one of the shafts 27. The intermediate portion of casting 35 is formed with parallel bearing sleeves 38, which are in alignment with similar sleeves in the respective upper castings 34. Thrust bars 39 connect the forward ends of the plates 31 with the casting 35, and braces 40 make the connection there rigid. There is thus provided an elongated inclined frame structure formed of triangularly related members embracing the cross part 10 of the axle structure. It will be seen that the main members of the frame extend from adjacent the ground level to a point directly above the axle structure and that the frame is pivotally carried on shaft 27, thus providing an axis of support located to the rear of the axle structure. It is also to be noted that the forward end of the frame is close behind the wheels of the steering truck 14, which thus acts as a gauge to maintain the stalk lifters or points 32 at an even distance from the ground surface. In order to adjust this distance and provide support for the forward portion of the frame, the tractor has mounted on it a bell crank lever 41 provided with the usual locking mechanism and rack 42. The crank arm of this lever is connected by a link 43 to one end of a longitudinally adjustable tie-bar or link 44, which flexibly connects the frames lying on opposite sides of the tractor and holds them in properly spaced relation to the plant rows. By manipulation of the levers 41 on the sides of the tractor, the frames can be adjusted or lifted and lowered on their axis of pivotal support on shafts 27.

The stripping mechanism on the respective frames forms the subject-matter of applicant's Patent No. 1,769,104 of July 1, 1930, and comprises stripper belts or chains 45, one on each board or plate 31. These belts are driven by upwardly extending shafts 46 journaled in the sleeves 38 of the lower casting 35 in the rear extension of the frame and in the bearings in the upper castings 34. These shafts are driven from shafts 27 through bevel pinions, as best seen in Figure 3. At the upper ends, the shafts 46 carry sprockets, over which the stripper belts 45 are trained, and idler sprockets 47 on the lower ends of the plates 31 carry the other ends of the belts. The belts 45 travel with the inner runs moving upwardly adjacent the inner edges of plates 31 and are provided with laterally projecting comb-like fingers 48 arranged to overlap, as seen in Figure 2, in the space between the inner edges of the gathering plates 31. Under the interspace between plates 31 there is mounted a pair of plant grasping rolls 49, which are driven from the shafts 46 in the manner clearly shown on the drawings. As the apparatus travels along the plant rows, the plants pass between the conveyer plates and into engagement with the stripping fingers which strip the plant stalks from stem to top as the machine moves on. Soon after engagement of the plants by the stripping fingers, the plants or stalks are grasped between the rolls 49, which are rotated in a direction to pull the plants downwardly through the stripping fingers. These rolls tend to hold the branches and twigs and prevent these from being stripped from the cotton plants along with the bolls. Preferably, some of the stripping fingers 48 and the rolls 49 are composed of yielding material, such as rubber.

In the operation of the stripping mechanism, the stripped bolls are carried upwardly on the overlapped fingers 48 and between the vertical inner walls of the shields 33 to the upper ends of the elongated stripper frames where they are thrown or discharged into a bin or receptacle which is mounted on the support 20 and is wide enough to receive the material from both harvesting frames. The bin 50 is preferably of the rearwardly dumping type.

The construction and arrangement above described provides a two row, self-propelled cotton stripper, driven from the power plant of the tractor and so mounted thereon as to provide pivotal support for the stripper frames located on a transverse axis back of the tractor axle and below the level of the tractor body, and means for adjustment of the stripper units vertically and laterally. The arrangement is, therefore, one in which the stripper frames are propelled or pushed from points back of the axle and comparatively near the ground level and at the location where the tractor is best adapted to receive the draft stresses. The construction and arrangement of the apparatus is also such as to place the weight of the stripper frames forwardly of the tractor axle and that of the driving mechanism and receiving bin back of the axle, thus effecting an even distribution of weights on the tractor.

The principle involved in the organization herein disclosed is, of course, not restricted to the particular harvesting units illustrated, and the invention is to be construed by the scope of the following claims.

What is claimed is:

1. The combination with a tractor having a rear axle structure, a body extending forwardly from the axle structure, and a power take-off shaft projecting adjacent the axle structure, of a support extending rearwardly from the axle structure and carried thereby, a transversely extended shaft journaled on the support behind the axle structure, an inclined elongated frame at the side of the tractor body having its forward end adjacent the ground level and its rear portion above the axle structure, a rearward extension on said frame pivotally supported on the transversely extending shaft, means on the tractor forward of the axle structure for adjustably supporting the forward portion of the frame, a driving connection between the power take-off shaft and the transverse shaft, crop gathering mechanism carried by the inclined frame, and driving connections between said mechanism and the transverse shaft.

2. The combination with a row crop tractor having an extended rear axle structure supported at the ends on traction wheels adapted to span two plant rows and having a central body extending forwardly from the axle structure and supported on a dirigible truck, of a support extending rearwardly from the axle structure and carried thereby, an elongated inclined frame positioned at each side of the tractor body within the tread lines of the traction wheels having rearward extensions pivoted to the support on a transverse axis behind the axle structure, said frames extending from adjacent the ground level to points directly above the axle structure, means for adjustably supporting the frames on the pivotal connection with the support, and crop gathering mechanism carried by the respective frames.

3. The combination with a row crop tractor having an extended upwardly arched rear axle structure supported at the ends on traction wheels and adapted to span two plant rows, a central body extending forwardly from the axle structure and supported on a dirigible truck, and a power take-off shaft projecting on a horizontal plane below the transverse portion of the arched axle, of a substantially horizontal supporting frame projecting rearwardly from the axle structure and carried thereby, a pair of transversely aligned drive shafts journaled on the supporting frame on substantially the same horizontal plane as the power take-off shaft, a driving connection between the power take-off shaft and the two aligned shafts, elongated inclined frames positioned at each side of the tractor body within the tread lines of the traction wheels and extending from adjacent the ground level to points directly above the axle structure, a rearward and downward extension at the upper ends of the respective frames pivotally supported on the respective drive shafts including power transmitting elements, cotton stripping mechanism on the inclined frames driven through said power transmitting elements, and means for adjustably supporting the forward portions of the frames from the tractor.

4. The combination with a row crop tractor having an extended rear axle structure supported at the ends on traction wheels adapted to span two plant rows and having a central body extending forwardly from the axle structure and supported on a dirigible truck, of crop harvesting and receiving means comprising an elongated inclined frame portion at each side of the tractor body within the tread lines of the traction wheels, said frames extending from points behind the dirigible truck and adjacent the ground level to points directly above the axle structure, power actuated harvesting mechanism on said frames delivering towards the rear of the axle structure, means for supporting said frames on the tractor, a support extending rearwardly of the axle structure and carried thereby, mechanism on said support for driving the harvesting mechanisms, and a crop receiving bin carried by said support behind the axle structure.

5. The combination with a row crop tractor having an extended rear axle structure supported at the ends on traction wheels adapted to span a plurality of plant rows and having a central body extending forwardly from the axle structure with dirigible supporting wheels at its front end, of an elongated inclined frame positioned at the side of the tractor body within the tread line of traction wheels and extending from a point behind the dirigible supporting wheels and adjacent the ground level to an elevated point in the central transverse plane of the axle structure, a transverse shaft supported on the axle structure and spaced rearwardly therefrom, means pivotally supporting the rear of the elongated frame to said shaft, and vertically adjustable supporting means between the tractor and said frame.

In testimony whereof I affix my signature.

BERT R. BENJAMIN.